(12) United States Patent
Mardilovich et al.

(10) Patent No.: US 7,033,691 B2
(45) Date of Patent: Apr. 25, 2006

(54) MEMS-BASED FUEL CELL AND METHODS

(75) Inventors: Peter Mardilovich, Corvallis, OR (US);
Gregory S Herman, Albany, OR (US);
David Champion, Lebanon, OR (US);
James O'Neil, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 472 days.

(21) Appl. No.: 10/269,771

(22) Filed: Oct. 10, 2002

(65) Prior Publication Data
US 2004/0033403 A1    Feb. 19, 2004

Related U.S. Application Data

(63) Continuation-in-part of application No. 10/219,507, filed on Aug. 14, 2002.

(51) Int. Cl.
*H01M 8/10*    (2006.01)
*H01M 2/14*    (2006.01)

(52) U.S. Cl. ............................................. 429/30; 429/38

(58) Field of Classification Search .................. 429/12, 429/30
See application file for complete search history.

(56) References Cited

U.S. PATENT DOCUMENTS

| | | | |
|---|---|---|---|
| 5,641,585 A | 6/1997 | Lessing et al. | |
| 5,753,385 A | 5/1998 | Jankowski et al. | |
| 6,106,965 A | 8/2000 | Hirano et al. | |
| 6,383,556 B1 | 5/2002 | Lott et al. | |
| 6,638,654 B1 * | 10/2003 | Jankowksi et al. | 429/26 |
| 6,841,290 B1 * | 1/2005 | Klitsner et al. | 429/44 |
| 2001/0044373 A1 | 11/2001 | Lott et al. | |
| 2002/0048701 A1 | 4/2002 | Ukai et al. | |

FOREIGN PATENT DOCUMENTS

| | | |
|---|---|---|
| FR | 2008427 | 1/1970 |
| JP | 56-084882 | 7/1981 |
| JP | 64-076671 | 3/1989 |
| JP | 07-201348 | 8/1995 |
| WO | WO00/45457 A3 | 8/2000 |

OTHER PUBLICATIONS

J. B. Bates et al. "Rechargable Solid State Lithium Microbatteries" Proc. IEEE Micro Electro Mechanical Systems, Fort Lauderdale, FL Feb. 7-10, 1993, pp. 82-86.
G. McLean et al. "Application of Micro-Scale Techniques to Fuel Cell Systems Design" 10th Canadian Hydrogen Conference, Quebec City, May 17-20, 2000, pp. 349-358.

* cited by examiner

*Primary Examiner*—Patrick Joseph Ryan
*Assistant Examiner*—Julian Mercado

(57) ABSTRACT

A fuel cell has a MEMS fuel-cell structure including an anode, a cathode, and an electrolyte, formed on a substrate, a portion of the substrate being removed from beneath the MEMS structure to leave the MEMS structure suspended in membrane form. An opening may extend through the substrate to leave the MEMS fuel-cell structure in a cantilevered configuration, supported by only one edge. Additional openings may be formed to relieve mechanical stress near an edge or edges supporting the MEMS fuel-cell structure, and/or to limit heat-conducting paths. Specially adapted methods are disclosed for fabricating the MEMS-based fuel cell in any of its various configurations.

36 Claims, 4 Drawing Sheets

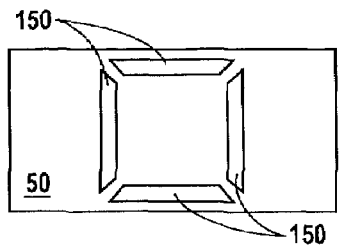
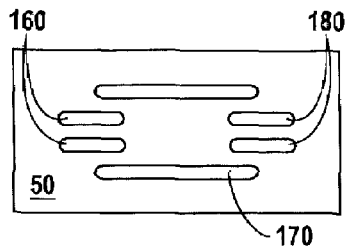
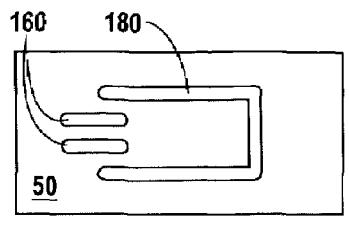
FIG. 10A  FIG. 11A  FIG. 12A
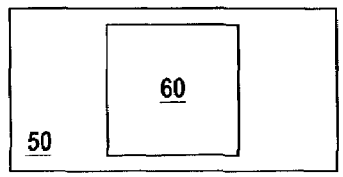
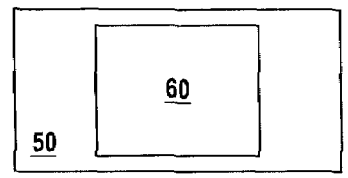
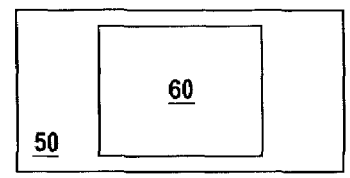
FIG. 10B  FIG. 11B  FIG. 12B
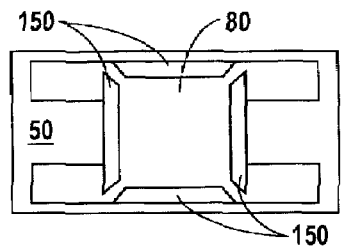
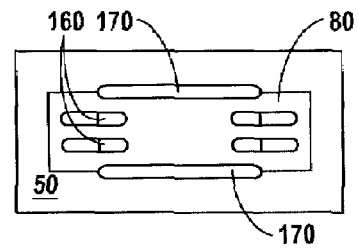
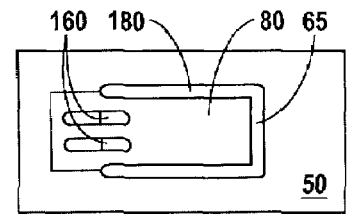
FIG. 10C  FIG. 11C  FIG. 12C
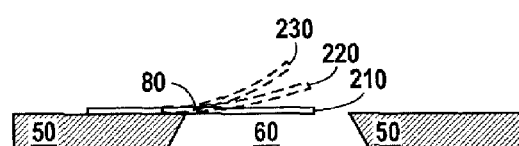
FIG. 13
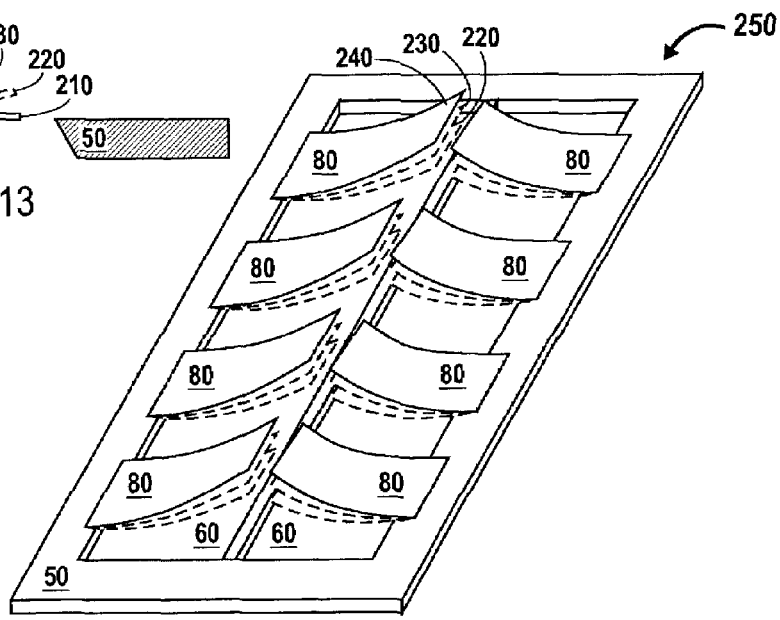
FIG. 14

US 7,033,691 B2

MEMS-BASED FUEL CELL AND METHODS

CROSS-REFERENCE TO RELATED APPLICATION

This application is a continuation-in-part of co-pending and commonly assigned application Ser. No. 10/219,507, filed Aug. 14, 2002, the entire disclosure of which is incorporated herein by reference.

TECHNICAL FIELD

This invention relates to fuel cells and more particularly to MEMS-based fuel-cell structures and related methods.

BACKGROUND

Various portable devices, such as laptop computers, personal digital assistants (PDA's), portable digital and video cameras, portable music players, portable electronic games, and cellular phones or other wireless devices, require portable power sources. The weight and inconveniences of single-use batteries and rechargeable batteries have motivated efforts to replace those power sources for portable use. Thus, there is an increasing demand for light-weight, reusable, efficient, and reliable power sources in such applications and in many other applications as well. In attempts to meet these needs, various portable fuel cells have been developed, such as ceramic-based solid-oxide fuel cells, direct methanol fuel-cell (DMFC) systems, reformed-methanol-to-hydrogen fuel-cell (RMHFC) systems, and other proton-exchange-membrane (PEM) fuel-cell systems. Microscale design principles have been applied to the design of portable fuel cells to provide improved power density and efficiency and to provide lower cost. There is a continuing need and a large anticipated market for improved practical compact portable fuel cells with rapid startup times and improved efficiency. There is a particular need for compact portable fuel cells with improved thermal isolation of their active portions and with reduced thermally-induced mechanical stress.

BRIEF DESCRIPTION OF THE DRAWINGS

The features and advantages of the disclosure will readily be appreciated by persons skilled in the art from the following detailed description when read in conjunction with the drawings, wherein:

FIGS. 10A–10C are top plan views illustrating various stages in fabrication of a sixth embodiment of a fuel cell made in accordance with the invention.

FIGS. 11A–11C are top plan views illustrating various stages in fabrication of a seventh embodiment of a fuel cell made in accordance with the invention.

FIGS. 12A–12C are top plan views illustrating various stages in fabrication of a eighth embodiment of a fuel cell made in accordance with the invention.

FIG. 13 is a side elevation view schematically illustrating various positional configurations taken by a fuel cell structure in response to temperature changes.

FIG. 14 is a perspective view schematically illustrating various positional configurations taken in response to temperature changes by fuel cell structures in an array of fuel cells made in accordance with the invention.

DETAILED DESCRIPTION OF EMBODIMENTS

Figure 1A:
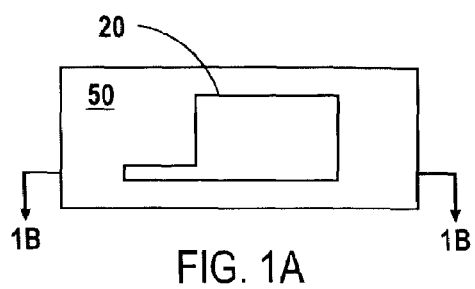
FIG. 1A is a top plan view and FIG. 1B is a side elevation cross-sectional view illustrating a stage in fabrication of a first embodiment of a fuel cell made in accordance with the invention.

Throughout this specification and the appended claims, the term "fuel cell" means a fuel cell in its usual meaning or a battery cell having an anode, a cathode, and an electrolyte. The term "MEMS" has its conventional meaning of a micro-electro-mechanical system.

For clarity of the description, the drawings are not drawn to a uniform scale. In particular, vertical and horizontal scales may differ from each other and may vary from one drawing to another.

One aspect of the invention is a MEMS-based fuel cell 10, as shown in the embodiments of FIGS. 4A, 4B, 6, 7A, 7B, 8, and 9, in which MEMS techniques are used to make an anode 20, a cathode 30, and an electrolyte 40 in contact with the anode and cathode. The fuel cell may be made based on a substrate 50 having an opening 60 extending upward from its bottom surface 70 and having a MEMS structure 80 with a portion 90 on the top surface 55 of the substrate and another portion 100 that extends over only part of opening 60. Portion 90 of the MEMS structure has mechanical and thermal contact with substrate 50.

Figure 9:
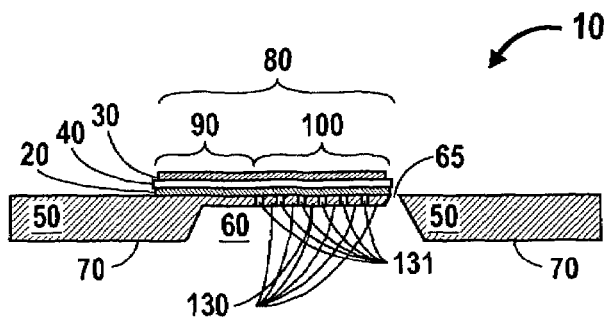
FIG. 9 is a side elevation cross-sectional view illustrating a fifth embodiment of a fuel cell made in accordance with the invention.

A portion 65 of the opening extends through the substrate. Thus, the portion 100 of the MEMS structure that extends over part of the opening forms a cantilever 110, supported along only one edge 120. In some embodiments, cantilever 110 is supported by the portion 90 of the MEMS structure on the top surface 55 of the substrate 50. A salient portion 130 of substrate 50 may form part of cantilever 110, as shown in FIG. 9.

While a fuel supply and means for removing excess products of the fuel-cell reaction are needed, conventional fuel supply and excess-product removal may be used with fuel cells made in accordance with the invention and therefore will not be described further herein.

Figure 4A:
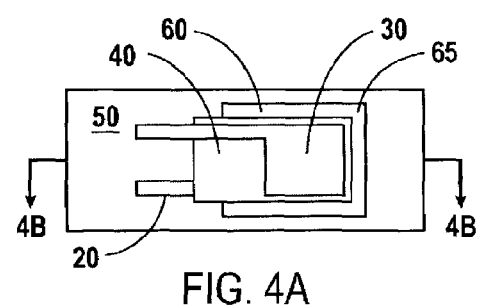
FIG. 4A is a top plan view and FIG. 4B is a side elevation cross-sectional view illustrating another stage in fabrication of a first embodiment of a fuel cell made in accordance with the invention.
Figure 4B:
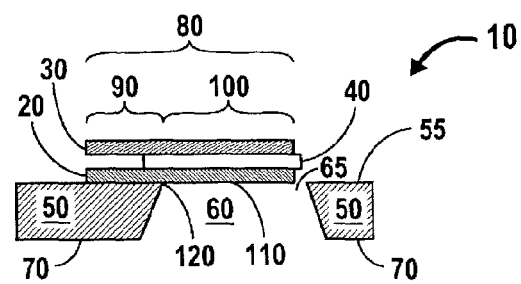
Figure 8:
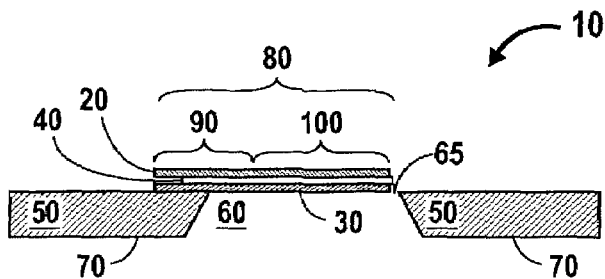
FIG. 8 is a side elevation cross-sectional view illustrating a fourth embodiment of a fuel cell made in accordance with the invention.

By way of illustration, various embodiments of a MEMS-based fuel cell 10 made in accordance with the invention are described below, beginning with a first embodiment in which the bottom part of cantilever 110 is formed by a layer that serves as anode 20, which extends outward from the top surface 55 of substrate 50 and over part of opening 60. In this first embodiment, electrolyte 40 forms the middle layer of the MEMS structure, and cathode 30 forms the top layer, as shown in FIGS. 3A, 3B, 4A, and 4B. Thus, anode 20 supports the electrolyte and cathode. In this and other embodiments, at least one element selected from among anode 20, cathode 30, and electrolyte 40 extends over both portions 90 and 100 of MEMS structure 80. Thus, in such embodiments, at least one of the three elements, anode, electrolyte, or cathode (not necessarily the lowest layer), supports the remaining elements. Thus, MEMS structure 80 may comprise a cathode layer supported by an electrolyte layer, the electrolyte layer being supported in turn by an anode layer (FIG. 4B). Or MEMS structure 80 may comprise an anode layer supported by an electrolyte layer, the electrolyte layer being supported in turn by a cathode layer (FIG. 8).

Alternatively, as described below for another embodiment, a salient portion 130 of substrate 50 may support the anode, electrolyte, and cathode. Several of the embodiments of MEMS structure 80 described and illustrated herein comprise stacks of layers. The layers stacked, including the three elements, anode, electrolyte, and cathode, may be thin films.

FIGS. 1A, 1B, 2A, 2B, 3A, 3B, 4A, and 4B illustrate various stages in fabrication of a first embodiment of a fuel cell made in accordance with the invention. FIGS. 1A, 2A, 3A, and 4A are top plan views, and FIGS. 1B, 2B, 3B, and 4B are side elevation cross-sectional views.

Figure 5:
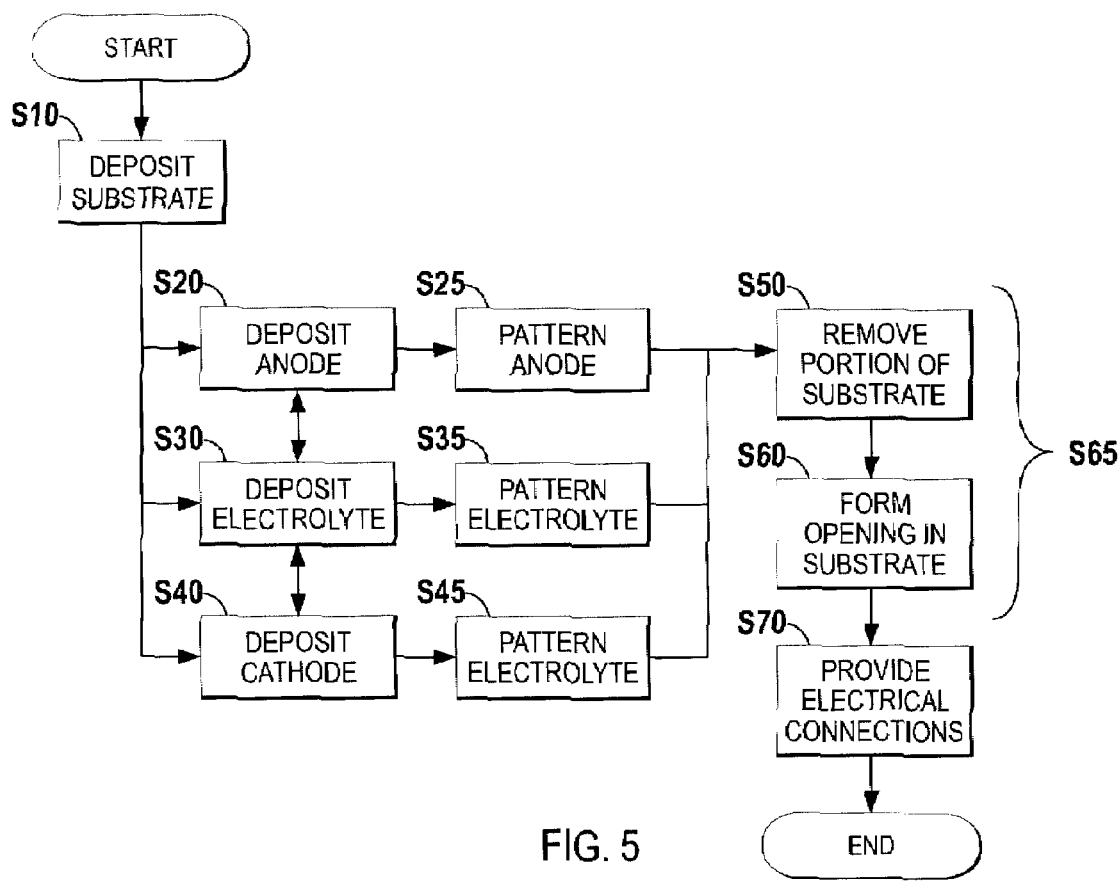
FIG. 5 is a flow chart illustrating an embodiment of a method for fabricating a fuel cell in accordance with the invention.

FIG. 5 is a flow chart illustrating an embodiment of a method for fabricating a fuel cell in accordance with the invention. In FIG. 5, various steps of the fabrication method are denoted by reference numerals S10, S20, . . . , S70. For clarity, this description omits conventional steps known in the art and used for deposition and patterning of current collectors and of buffer layers (if required) between electrodes and electrolyte, or for application of barrier layers to protect portions of the structure when etching various components such as the anode cathode, electrolyte, and substrate.

In an overall fabrication method as shown of FIG. 5, a substrate 50 is provided (step S10), a portion of which will be removed later, as described below. Substrate 50 is an etchable material suitably stable at a desired temperature of operation. Depending on the operation temperature range, the substrate material may be a semiconductor (e.g., silicon), a metal (e.g., stainless steel), an oxide (e.g., titanium dioxide), a ceramic (e.g., alumina), a plastic or solid polymer (e.g., polytetrafluoroethylene). Substrate 50 may be a silicon wafer, for example, as used in conventional semiconductor integrated circuit fabrication. Three fuel-cell components (anode 20, cathode 30, and electrolyte 40) are deposited in steps S20, S40, and S30 respectively. If necessary, the anode 20 is patterned (step S25). Similarly, the cathode 30 and/or electrolyte 40 may be patterned (steps S45 and S35 respectively).

Figure 2A:
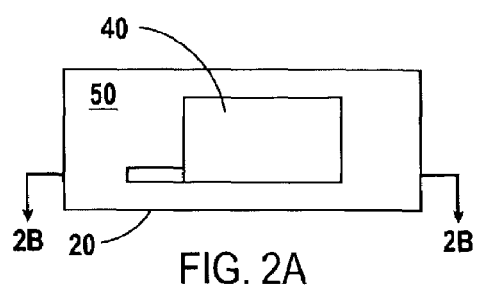
FIG. 2A is a top plan view and FIG. 2B is a side elevation cross-sectional view illustrating another stage in fabrication of a first embodiment of a fuel cell made in accordance with the invention.
Figure 1B:
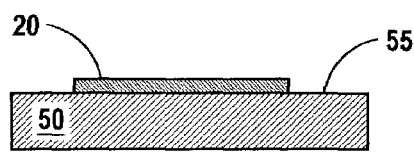
Figure 2B:
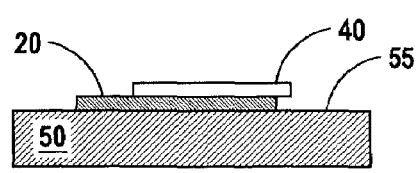
Figure 3A:
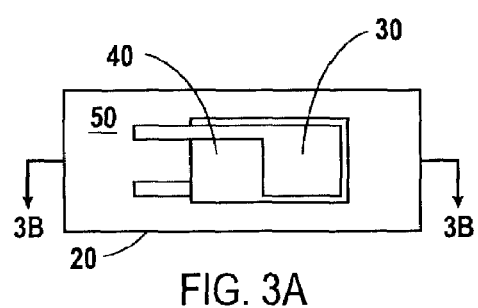
FIG. 3A is a top plan view and FIG. 3B is a side elevation cross-sectional view illustrating another stage in fabrication of a first embodiment of a fuel cell made in accordance with the invention.
Figure 3B:
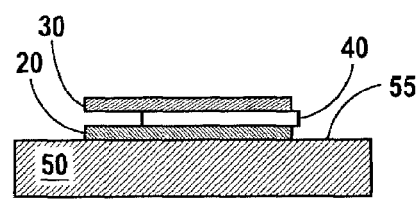

The order of depositing these three components (i.e., the sequence of performing steps S20, S30, and S40) may be varied for fabricating various embodiments of the fuel-cell structure. For fabricating the first embodiment illustrated in FIG. 4B, anode 20 is deposited on substrate 50 first (step S20) and patterned (step S25, FIGS. 1A and 1B), then electrolyte 40 is deposited on anode 20 (step S30) and patterned (step S35) as shown in FIGS. 2A and 2B, and then cathode 30 is deposited on electrolyte 40 (step S40) and patterned (step S45, FIGS. 4A and 4B). If one or more of the fuel-cell elements, e.g., electrolyte 40, is deposited through a mask, a separate patterning step, e.g., step S35, is not needed.

A portion of substrate 50 under the three fuel-cell components is removed (step S50) to leave a portion 100 of MEMS structure 80 supported in membrane form. An opening 60 is also formed in substrate 50 (step S60) in at least partial alignment with MEMS structure 80. Steps S50 and S60 can be performed simultaneously or combined into one step (S65). Those skilled in the art will recognize that any known conventional method may be used to align features on one side of substrate 50 with features on the other side, e.g., reflective alignment optics or infrared alignment through an infrared-transparent substrate.

As opening 60 is formed, a portion 65 of opening 60 may be extended though substrate 50, to leave a portion 100 of MEMS structure 80 supported in cantilever form. In steps S50 and S60 or the combined step S65, a salient portion 130 of substrate 50 may be left to provide additional mechanical support. See FIG. 9, described below.

Electrical connections (not shown) are made (step S70) at least to anode 20 and cathode 30. Step S70 may be performed by depositing separate terminal electrodes in electrical contact with anode 20 and with cathode 30. These may be conventional conductive terminal pads as used in semiconductor integrated circuits, for example. If fuel-cell structures are arranged in a stack of layers, the electrical connections may include vias connecting with fuel-cell structures on various layers of the stack.

Figure 6:
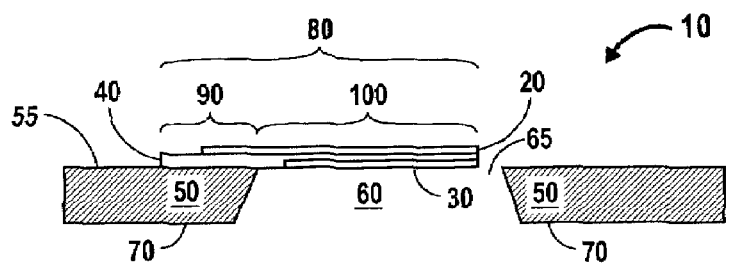
FIG. 6 is a side elevation cross-sectional view illustrating a second embodiment of a fuel cell made in accordance with the invention.
Figure 7A:
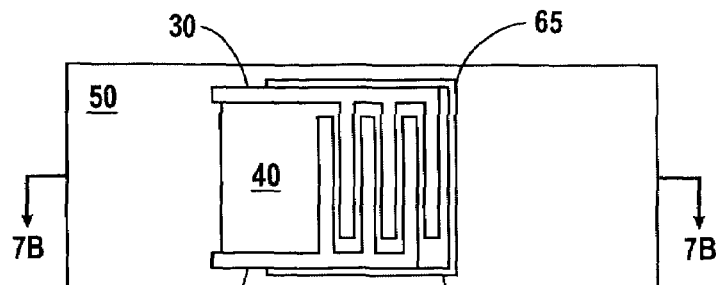
FIG. 7A is a top plan view and FIG. 7B is a side elevation cross-sectional view illustrating a third embodiment of a fuel cell made in accordance with the invention.
Figure 7B:
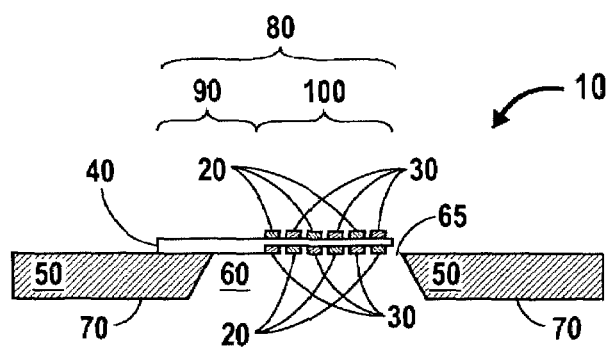

As shown in FIGS. 6, 7A, and 7B, embodiments may be made in which the fuel-cell element extending over both of the portions 90 and 100 of MEMS structure 80 is the electrolyte 40. For such embodiments, electrolyte 40 is any suitable solid electrolyte. Examples of suitable solid-electrolyte materials are cubic fluorites such as Sm- or Gd-doped $CeO_2$ and yttria-stabilized zirconia (YSZ, e.g., 8 mole % yttria), doped perovskite oxides such as $La_{0.9}Sr_{0.1}Ga_{0.8}Mg_{0.2}O_3$, proton-conducting perovskites such as $BaZrO_3$, $SrCeO_3$, and $BaCeO_3$, other proton-exchange ceramics, or ion-conductive polymers such as a perfluorosulfonic acid resin membrane (e.g., Nafion™, available from DuPont Chemicals, Inc., Wilmington, Del.). FIG. 6 shows a second embodiment and FIGS. 7A and 7B show a third embodiment.

In the third embodiment, illustrated in FIGS. 7A and 7B, electrolyte 40, while supporting anode 20 and cathode 30, is the middle layer of MEMS structure 80. Thus, both cathode 30 and anode 20 are supported by a solid electrolyte layer. Also, in this embodiment, anode 20 and cathode 30 are suitably patterned to provide interleaved electrodes, spaced apart from each other. Both anode and cathode are patterned thin films in contact with the same side of the solid electrolyte layer, but spaced apart from each other. Such interleaving of electrodes may also be employed in other embodiments.

Thus, the fuel cell structure may be made with a cathode and/or an anode that is a patterned thin film in contact with a solid electrolyte layer. Each of the anode and cathode may be a thin film in contact with opposite sides of the electrolyte or in contact with the same side of the electrolyte.

FIG. 8, a side elevation cross-sectional view, shows a fourth embodiment, in which the fuel-cell element extending over both of the portions 90 and 100 of MEMS structure 80 is the cathode 30.

FIG. 9 is a side elevation cross-sectional view illustrating a fifth embodiment of fuel cell 10. As shown in FIG. 9, a salient portion 130 of substrate 50 supports the anode 20, cathode 30, and electrolyte 40 of fuel cell 10. Salient portion 130 is patterned and etched to provide openings 131 extending through portion 130 to allow passage of fuel and/or an oxidant such as air. Openings 131 may be formed simultaneously with opening 65. If substrate 130 is sufficiently porous without them, then of course openings 131 are not needed.

As pointed out above, the sequence of steps may be varied depending on the application and on the details of the desired fuel-cell structure. Thus, the fuel-cell structure may be formed by depositing an electrolyte upon the substrate, depositing and patterning an anode upon at least the electrolyte, (optionally) depositing an electrolyte over the anode, and depositing and patterning a cathode on at least the electrolyte, the cathode being spaced from the anode. Alternatively, the fuel-cell structure may be formed by depositing an electrolyte upon the substrate, depositing and patterning a cathode upon at least the electrolyte, (optionally) depositing an electrolyte over the cathode, and depositing and patterning an anode upon at least the electrolyte, the anode again being spaced from the cathode. In another alternative sequence, the fuel-cell structure may be formed by depositing and patterning an anode upon the substrate, depositing an electrolyte upon at least the anode, depositing and patterning a cathode upon at least the electrolyte, with the cathode again being spaced from the anode. In yet another alternative sequence, the fuel-cell structure may be formed by depositing and patterning a cathode upon the substrate, depositing an electrolyte upon at least the cathode, depositing and patterning an anode upon at least the electrolyte, again with the anode being spaced from the cathode. When the anode and cathode are to be interleaved on both sides of the electrolyte, as shown in FIGS. 7A and 7B, multiple depositions and/or patterning steps may be needed to complete all the anode and cathode patterns.

A mechanical stress-relief feature may be provided by forming one or more openings contiguous with both of the portions 90 and 100 of MEMS structure 80. The openings of the stress-relief feature may extend downward from the substrate top surface 55 and may extend through substrate 50 to its bottom surface. Such openings also provide a degree of thermal isolation by limiting heat-conducting paths. By way of illustration, some examples of such stress-relief features are shown in FIGS. 10A–10C, 11A–11C, and 12A–12C, each of which has a number of elongated openings.

FIGS. 10A–10C are top plan views illustrating various stages in fabrication of a sixth embodiment of a fuel cell made in accordance with the invention. Openings 150 are formed along edges of opening 60 so that they are contiguous with portions 90 and 100 of MEMS structure 80. As shown, openings 150 are elongated in a direction parallel to the top surface of substrate 50 and generally parallel to edges of opening 60.

FIGS. 11A–11C are top plan views of various stages in fabrication of a seventh embodiment. Openings 160 are elongated in a direction parallel to the top surface of substrate 50 and generally perpendicular to edges of opening 60, while openings 170 are elongated in a direction generally parallel to edges of opening 60.

FIGS. 12A–12C are top plan views illustrating various stages in fabrication of an eighth embodiment. In this embodiment, openings 160 are similar to those of FIGS. 11A–11C. In the embodiment shown in FIGS. 12A–12C, openings 160 for mechanical stress relief are formed adjacent to the one edge by which MEMS structure 80 is supported. Another opening 180 extends around three sides of MEMS structure 80, generally parallel to three edges of opening 60 and effectively merged with that portion 65 of opening 60 that extends completely through substrate 50.

FIG. 13 is a side elevation view schematically illustrating various positional configurations 220 and 230 that may be taken by a fuel cell structure in response to temperature changes during operation of the fuel cell, due, for example, to differences in thermal expansion coefficient among the cathode, anode, electrolyte, and interconnects. Thus, a portion of MEMS structure 80 has an edge 210, free to move in response to heat to reduce mechanical stress that would otherwise occur if MEMS structure 80 were completely fixed.

FIG. 14 is a perspective view schematically illustrating various positional configurations 220, 230, and 240 taken in response to temperature changes by MEMS fuel-cell structures 80 in an array 250 of fuel cells made in accordance with the invention.

Thus, one aspect of the invention is provision of an electrical energy source comprising a combination of a MEMS structure including means for producing electrical current in an electrolyte with means for supporting the MEMS structure and means for cantilevering the MEMS structure from its means of support. Means for conducting heat away from the energy source may be provided. A portion of the MEMS structure having thermal contact with a substrate may be provided for conducting away heat generated in the MEMS structure. A portion of the MEMS structure may have one or more openings provided for relief of mechanical stress and/or for limiting heat-conducting paths.

Another aspect of the invention is a fabrication method specially adapted for fabricating such an energy source. This specially adapted method encompasses embodiments employing steps of providing a substrate, forming a MEMS fuel-cell structure on the substrate by performing the sub-steps of depositing an electrolyte, depositing and patterning an anode, optionally depositing additional electrolyte, depositing and patterning a cathode, and removing a portion of the substrate under the fuel-cell structure. An opening through the substrate may be formed adjacent to the MEMS fuel-cell structure while leaving the MEMS fuel-cell structure supported by only one edge, whereby the MEMS fuel-cell structure is cantilevered. Additional openings may be formed for stress relief and/or for limiting heat-conducting paths.

INDUSTRIAL APPLICABILITY

The present invention is useful in the manufacture of fuel cells. Fuel cells made by methods of the invention and electronic devices incorporating such fuel cells are applicable in many electronic applications, especially those requiring portable devices.

Although the foregoing has been a description and illustration of specific embodiments of the invention, various modifications and changes thereto can be made by persons skilled in the art without departing from the scope and spirit of the invention as defined by the following claims. For one example, a current collector may be included in a fuel cell made in accordance with the invention, such a current collector may be porous, and such a current collector may be used (by being deposited and optionally patterned first) to support the other elements of the fuel-cell structure, analogously to the embodiments in which an anode, electrolyte, or cathode supports the other elements. For another example, various fuel-cell structures in an array of fuel cells may have differing configurations adapted to facilitate their electrical interconnection and/or their fuel supplies and/or their response to heat generated. It is intended that the described and illustrated embodiments be considered exemplary only and that the true scope and spirit of the invention be defined by the following claims.

What is claimed is:

1. A fuel cell comprising:
   a substrate having a substrate top surface, a substrate bottom surface, and an opening, said opening extending upward from said substrate bottom surface; and
   a MEMS structure at least partially aligned with said opening, said MEMS structure including a first portion disposed on said substrate top surface and a second portion extending over only part of said opening, whereby said second portion of said MEMS structure forms a cantilever supported only by said first portion of said MEMS structure, said MEMS structure comprising an anode, a cathode, and an electrolyte in contact with said anode and cathode.

2. The fuel cell of claim 1, wherein at least a portion of said opening extends through said substrate.

3. The fuel cell of claim 1, wherein said cantilever comprises a salient portion of said substrate.

4. The fuel cell of claim 3, wherein said salient portion of said substrate supports the anode, cathode, and electrolyte of the fuel cell.

5. The fuel cell of claim 3, wherein said salient portion of said substrate includes openings extending through said salient portion.

6. The fuel cell of claim 3, wherein said salient portion of said substrate is porous.

7. The fuel cell of claim 1, wherein at least one element selected from said anode, cathode, and electrolyte extends over both said first and second portions of said MEMS structure.

8. The fuel cell of claim 7, wherein said at least one element extending over both of said first and second portions of said MEMS structure supports the remaining elements of said electrolyte, anode, and cathode.

9. The fuel cell of claim 7, wherein said at least one element extending over both of said first and second portions of said MEMS structure is the anode.

10. The fuel cell of claim 7, wherein said at least one element extending over both of said first and second portions of said MEMS structure is the cathode.

11. The fuel cell of claim 7, wherein said at least one element extending over both of said first and second portions of said MEMS structure is the electrolyte.

12. The fuel cell of claim 7, wherein said at least one element extending over both of said first and second portions of said MEMS structure comprises at least two elements selected from said, anode, cathode, and electrolyte.

13. The fuel cell of claim 1, wherein said MEMS structure comprises a stack of layers, said layers including said electrolyte, anode, and cathode.

14. The fuel cell of claim 1, wherein said MEMS structure comprises a cathode layer supported by an electrolyte layer, said electrolyte layer being supported in turn by an anode layer.

15. The fuel cell of claim 1, wherein said MEMS structure comprises an anode layer supported by an electrolyte layer, said electrolyte layer being supported in turn by a cathode layer.

16. The fuel cell of claim 1, wherein both said cathode and anode are supported by a solid electrolyte layer.

17. The fuel cell of claim 16, wherein said cathode comprises a patterned thin film in contact with said solid electrolyte layer.

18. The fuel cell of claim 16, wherein said anode comprises a patterned thin film in contact with said solid electrolyte layer.

19. The fuel cell of claim 16, wherein both said anode and cathode comprise patterned thin films in contact with said solid electrolyte layer.

20. The fuel cell of claim 16, wherein each of said anode and said cathode comprises a thin film in contact with opposite sides of said solid electrolyte layer.

21. The fuel cell of claim 16, wherein each of said anode and said cathode comprises a patterned thin film in contact with the same side of said solid electrolyte layer, said anode and cathode being spaced apart from each other.

22. The fuel cell of claim 21, wherein said anode and said cathode are suitably patterned to interleave with each other.

23. A fuel cell comprising:
   a substrate having a substrate top surface, a substrate bottom surface, and an opening, said opening extending upward from said substrate bottom surface; and a MEMS structure at least partially aligned with said opening, said MEMS structure including a first portion disposed on said substrate top surface and a second portion extending over only part of said opening, whereby said second portion of said MEMS structure forms a cantilever supported only by said first portion of said MEMS structure, said MEMS structure comprising an anode, a cathode, and an electrolyte in contact with said anode and cathode, the fuel cell further comprising a mechanical stress-relief feature, said stress-relief feature comprising at least a second opening contiguous with both of said first and second portions of said MEMS structure.

24. The fuel cell of claim 23, wherein said at least second opening of said stress-relief feature extends downward from said substrate top surface.

25. The fuel cell of claim 23, wherein said at least second opening of said stress-relief feature extends through said substrate.

26. The fuel cell of claim 23, wherein said at least second opening of stress-relief feature comprises an opening elongated in a direction parallel to said substrate top surface.

27. The fuel cell of claim 23, wherein said stress-relief feature comprises a series of openings extending through said substrate, each opening of said series of openings being disposed contiguous with said second portion of said MEMS structure.

28. An electronic device comprising the fuel cell of claim 1.

29. A fuel cell comprising:
   a substrate having a substrate top surface, a substrate bottom surface, and an opening, said opening extending upward from said substrate bottom surface; and
   a MEMS structure at least partially aligned with said opening, said MEMS structure including a first portion disposed on said substrate top surface and a second portion extending cantilevered over only part of said opening, said second portion of said MEMS structure comprising a patterned thin film anode, a patterned thin film cathode, and a solid electrolyte in contact with said patterned thin film anode and cathode.

30. The fuel cell of claim 29, wherein said substrate comprises a material suitably stable at a desired temperature of operation, said material being selected from the list consisting of semiconductors, metals, oxides, ceramics, plastics, and solid polymers.

31. The fuel cell of claim 29, wherein said substrate comprises silicon.

32. An electrical energy source comprising in combination:
   a MEMS structure, said MEMS structure comprising means for producing electrical current in an electrolyte for delivering said electrical energy;
   means for supporting said MEMS structure; and
   means for cantilevering said MEMS structure from said means for supporting said MEMS structure.

33. The electrical energy source of claim 32, wherein said electrical-current-producing means includes an anode, a cathode, and said electrolyte disposed in contact with said anode and cathode.

34. The electrical energy source of claim 32, further comprising means for conducting heat away from said electrical-current-producing means.

35. A fuel cell comprising in combination:
   a substrate having a substrate top surface, a substrate bottom surface, and an opening, said opening extending upward from said substrate bottom surface; and
   a MEMS structure at least partially aligned with said opening, said MEMS structure including a first portion disposed adjacent to said substrate top surface and a second portion extending over only part of said opening,
   said MEMS structure comprising an anode, a cathode, and an electrolyte in contact with said anode and cathode,
   said first portion of said MEMS structure having thermal contact with said substrate for conducting away heat generated in said second portion of said MEMS structure and said first portion of said MEMS structure having one or more openings for relief of mechanical stress,
   said second portion of said MEMS structure having an edge free to move in response to said generated heat to reduce said mechanical stress.

36. An electronic device comprising the fuel cell of claim 35.

* * * * *